(12) United States Patent
Mitani

(10) Patent No.: US 11,242,818 B2
(45) Date of Patent: Feb. 8, 2022

(54) CONTROL DEVICE OF INTERNAL COMBUSTION ENGINE

(71) Applicant: TOYOTA JIDOSHA KABUSHIKI KAISHA, Aichi-ken (JP)

(72) Inventor: Shinichi Mitani, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/340,091

(22) Filed: Jun. 7, 2021

(65) Prior Publication Data

US 2021/0381465 A1    Dec. 9, 2021

(30) Foreign Application Priority Data

Jun. 9, 2020   (JP) .............................. JP2020-100216

(51) Int. Cl.
| | |
|---|---|
| *B60T 7/12* | (2006.01) |
| *F02D 41/40* | (2006.01) |
| *F02D 41/06* | (2006.01) |

(52) U.S. Cl.
CPC ......... *F02D 41/402* (2013.01); *F02D 41/064* (2013.01); *F02D 41/068* (2013.01); *F02D 2200/021* (2013.01); *F02D 2200/101* (2013.01); *F02D 2200/1002* (2013.01)

(58) Field of Classification Search
CPC .... F02D 19/024; F02D 19/023; F02D 19/022; F02D 19/061; F02D 19/0626; F02D 31/007; F02D 35/0046; F02D 2200/0614; F02D 2200/0618; F02D 2700/02; F02D 2700/0205; F02D 2700/0215; F02D 2700/0261; F02D 2700/0266; F02D 2700/0282

USPC .......................................... 701/103–105, 113
See application file for complete search history.

(56) References Cited

U.S. PATENT DOCUMENTS

| | | | |
|---|---|---|---|
| 10,480,437 B2* | 11/2019 | Nakada | ................ F01N 3/2006 |
| 10,669,909 B2* | 6/2020 | Nakada | ............... F02D 41/2451 |
| 2008/0245342 A1 | 10/2008 | Werner | |
| 2010/0139614 A1* | 6/2010 | Mori | ...................... F02M 45/02 |
| | | | 123/299 |

(Continued)

FOREIGN PATENT DOCUMENTS

| | | |
|---|---|---|
| JP | 200428046 A | 1/2004 |
| JP | 2006291971 A | 10/2006 |
| JP | 201766867 A | 4/2017 |

*Primary Examiner* — John Kwon
(74) *Attorney, Agent, or Firm* — Hauptman Ham, LLP

(57) ABSTRACT

A control device that controls an internal combustion engine includes an electronic control unit configured to, during an operation other than a start-up of the internal combustion engine, cause the fuel injection valve to execute one or a plurality of fuel injections in each cycle such that a target fuel injection amount in one injection becomes equal to or greater than a predetermined minimum injection amount, and when the internal combustion engine is started up, in a case where startability of the internal combustion engine is insufficient, execute an excess split injection control for causing the fuel injection valve to execute more fuel injections than the maximum number of fuel injections per cycle while making the target fuel injection amount in one injection smaller than the minimum injection amount per cycle and maintaining a target total fuel injection amount per cycle.

6 Claims, 11 Drawing Sheets

(56) References Cited

U.S. PATENT DOCUMENTS

| | | | |
|---|---|---|---|
| 2013/0151119 A1* | 6/2013 | Mariucci | F02M 25/089 |
| | | | 701/104 |
| 2015/0369158 A1* | 12/2015 | Nakajima | F02M 51/061 |
| | | | 123/294 |
| 2016/0356228 A1 | 12/2016 | Liu et al. | |
| 2016/0356230 A1 | 12/2016 | Watanabe et al. | |
| 2017/0051687 A1* | 2/2017 | Tsuruoka | F02D 41/0085 |
| 2019/0178198 A1* | 6/2019 | Okamura | F02M 59/20 |

* cited by examiner

CONTROL DEVICE OF INTERNAL COMBUSTION ENGINE

CROSS-REFERENCE TO RELATED APPLICATION

This application claims priority to Japanese Patent Application No. 2020-100216 filed on Jun. 9, 2020, incorporated herein by reference in its entirety.

BACKGROUND

1. Technical Field

The present disclosure relates to a control device of an internal combustion engine.

2. Description of Related Art

A split injection in which a plurality of fuel injections into each cylinder is executed per cycle is well-known (see, for example, Japanese Unexamined Patent Application Publication No. 2017-066867 (JP 2017-066867 A) and Japanese Unexamined Patent Application Publication No. 2006-291971 (JP 2006-291971 A)). In particular, in JP 2017-066867 A, it has been proposed to execute, at a cold-starting of an internal combustion engine, a split injection, to set the air-fuel ratio of an air-fuel mixture to the leaner side than the stoichiometric air-fuel ratio when supplied fuel is light fuel, and to set the air-fuel ratio of the air-fuel mixture to the stoichiometric air-fuel ratio when the supplied fuel is heavy fuel. Further, in JP 2006-291971 A, it has been proposed to increase the number of fuel injections in a split injection when heavy fuel having poor atomization characteristics is used as compared with when standard fuel is used.

SUMMARY

However, in each fuel injection in the split injection, when a target fuel injection amount becomes smaller than a certain minimum injection amount, a variation between the target fuel injection amount and an actual fuel injection amount is increased, and the fuel injection amount cannot be accurately controlled. Therefore, in executing the split injection, the number of fuel injections is basically set within a range in which the target fuel injection amount in each fuel injection becomes equal to or greater than a minimum injection amount.

However, depending on properties and the like of fuel used, when the number of fuel injections is set within the above range when the internal combustion engine is started up, the fuel may not be sufficiently atomized. In this case, deterioration of startability of the internal combustion engine, such as a delay at the start-up of the internal combustion engine, occurs.

The present disclosure provides a control device of an internal combustion engine that can restrict deterioration of startability.

Hereinafter, a configuration of the present disclosure will be described.

A control device of an internal combustion engine according to an aspect of the present disclosure includes a fuel injection valve that injects fuel into a combustion chamber and an electronic control unit. During an operation other than a start-up of the internal combustion engine, the electronic control unit is configured to cause the fuel injection valve to execute one or a plurality of fuel injections in each cycle such that a target fuel injection amount in one injection becomes equal to or greater than a predetermined minimum injection amount. When the internal combustion engine is started up, in a case where startability of the internal combustion engine is insufficient or expected to be insufficient even when the maximum number of fuel injections is executed per cycle within a range in which the target fuel injection amount in one injection becomes equal to or greater than the minimum injection amount, the electronic control unit is configured to execute an excess split injection control for causing the fuel injection valve to execute more fuel injections than the maximum number of injections per cycle while making the target fuel injection amount in one injection smaller than the minimum injection amount per cycle and maintaining a target total fuel injection amount per cycle.

In the above aspect, in the excess split injection control, the electronic control unit is configured to cause the fuel injection valve to execute one more fuel injection than the maximum number of injections per cycle.

In the above aspect, in a case where the startability of the internal combustion engine is insufficient or expected to be insufficient even when the excess split injection control is executed, the electronic control unit is configured to execute an increased amount split injection control for causing the fuel injection valve to execute more fuel injections than in the excess split injection control while maintaining the same target fuel injection amount per injection as in the excess split injection control.

In the above aspect, when the internal combustion engine is started up, after a predetermined cycle has passed since the fuel injection from the fuel injection valve was started, the electronic control unit is configured to determine whether the startability of the internal combustion engine is insufficient based on torque output by the internal combustion engine or a rotation speed of the internal combustion engine.

In the above aspect, the electronic control unit is configured to determine whether the startability of the internal combustion engine is insufficient based on properties of the fuel supplied to the internal combustion engine and a temperature of the internal combustion engine.

In the above aspect, when the internal combustion engine is started up, in a case where the startability of the internal combustion engine is sufficient or is expected to be sufficient when the maximum number of fuel injections is executed per cycle within the range in which the target fuel injection amount in one injection becomes equal to or greater than the minimum injection amount, the electronic control unit is configured to cause the fuel injection valve to execute the maximum number of fuel injections per cycle within the range in which the target fuel injection amount in one injection becomes equal to or greater than the minimum injection amount.

With the above aspect of the present disclosure, a control device of an internal combustion engine that can restrict deterioration of startability is provided.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, embodiments will be described in detail with reference to drawings. In the following description, same components are denoted by the same reference signs.

First Embodiment

Configuration of Internal Combustion Engine

Figure 1:
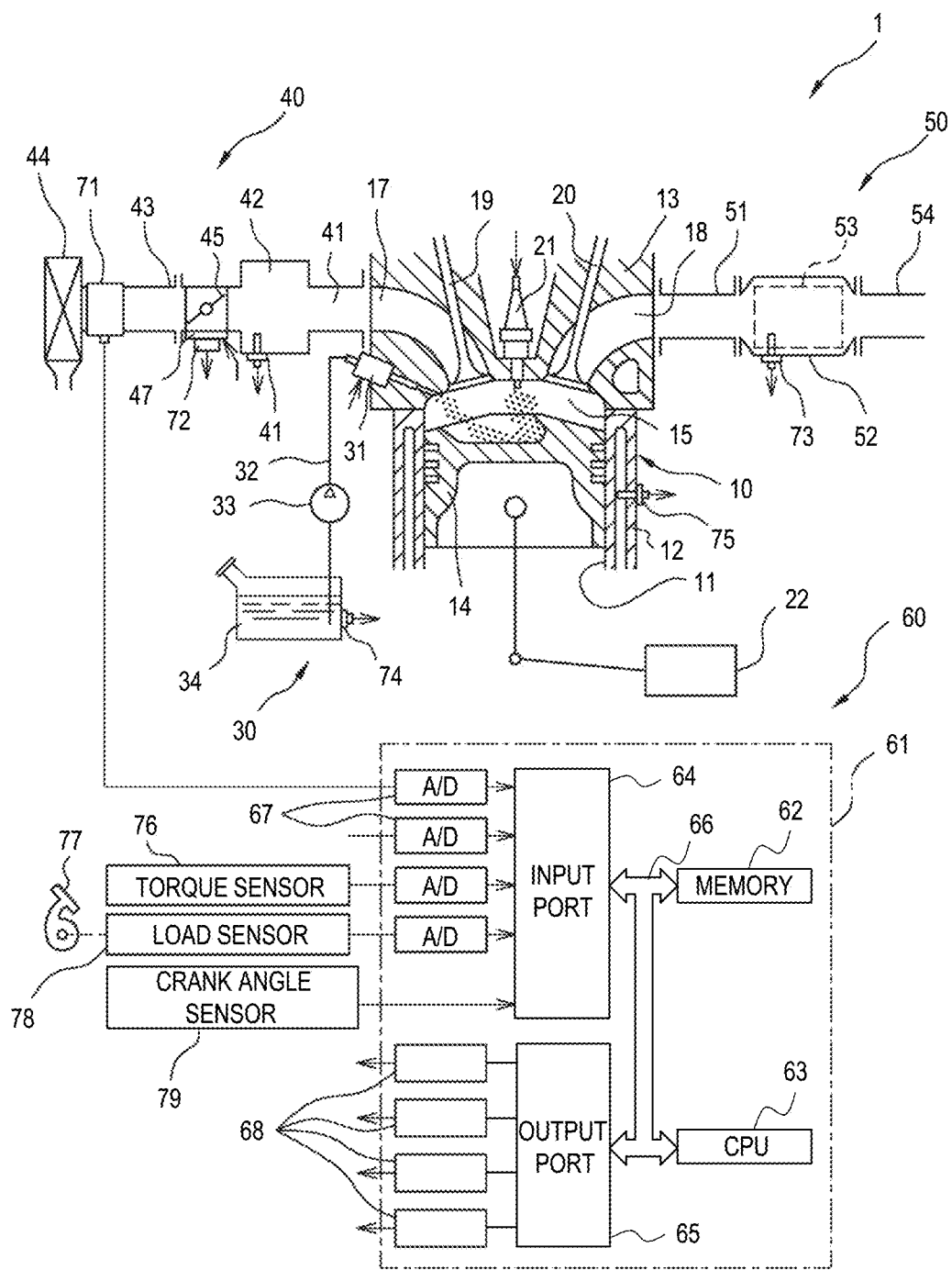
FIG. 1 is a diagram schematically illustrating an internal combustion engine in which a control device according to one embodiment is used.

First, an internal combustion engine in which a control device according to one embodiment is used will be described with reference to FIG. 1. The internal combustion engine of the present embodiment is used for driving a vehicle. FIG. 1 is a diagram schematically illustrating an internal combustion engine in which the control device according to one embodiment is used. As illustrated in FIG. 1, an internal combustion engine 1 includes an engine body 10, a fuel supply device 30, an intake-air system 40, an exhaust system 50, and a control device 60.

The engine body 10 includes a cylinder block 12 in which a cylinder 11 is formed, and a cylinder head 13 fixed on the cylinder block 12. In each cylinder 11, a piston 14 that moves in a reciprocating motion therein is arranged. In the cylinder 11 between the piston 14 and the cylinder head 13, a combustion chamber 15 that combusts an air-fuel mixture is formed.

In the cylinder head 13, an intake-air port 17 and an exhaust port 18 are formed. The intake-air port 17 and the exhaust port 18 communicate with the combustion chamber 15 of each cylinder 11. Between the combustion chamber 15 and the intake-air port 17, an intake-air valve 19 that opens and closes the intake-air port 17 is arranged. Similarly, between the combustion chamber 15 and the exhaust port 18, an exhaust valve 20 that opens and closes the exhaust port 18 is arranged.

Further, in the cylinder head 13, at the center of an inner wall surface that defines each cylinder 11, an ignition plug 21 is arranged. The ignition plug 21 is configured to generate sparks in response to an ignition signal and ignite the air-fuel mixture in the combustion chamber 15.

Further, the engine body 10 is provided with a starter motor 22 that drives a stopped internal combustion engine 1. The starter motor 22 rotates a crankshaft connected to the piston 14 via a connecting rod. When the internal combustion engine 1 is used in a hybrid vehicle, instead of the starter motor 22, a motor generator or the like, which is also used for driving a vehicle, may be used for driving the stopped internal combustion engine 1.

The fuel supply device 30 includes a fuel injection valve 31, a fuel supply pipe 32, a fuel pump 33, and a fuel tank 34. The fuel injection valve 31 is arranged in the cylinder head 13 so as to directly inject fuel into the combustion chamber 15 of each cylinder 11.

The fuel injection valve 31 is connected to the fuel tank 34 via the fuel supply pipe 32. The fuel pump 33 that pumps fuel in the fuel tank 34 is arranged in the fuel supply pipe 32. The fuel pumped by the fuel pump 33 is supplied to the fuel injection valve 31 via the fuel supply pipe 32, and is directly injected from the fuel injection valve 31 into the combustion chamber 15 as the fuel injection valve 31 is opened.

The intake-air system 40 includes an intake-air branch pipe 41, a surge tank 42, an intake-air pipe 43, an air cleaner 44, and a throttle valve 45. The intake-air port 17 of each cylinder 11 communicates with the surge tank 42 via the corresponding intake-air branch pipe 41, and the surge tank 42 communicates with the air cleaner 44 via the intake-air pipe 43. The throttle valve 45 is arranged in the intake-air pipe 43 and is rotated by a throttle valve drive actuator 47 so as to change a size of an opening area of an intake-air passage. The intake-air port 17, the intake-air branch pipe 41, the surge tank 42, and the intake-air pipe 43 form the intake-air passage through which intake gas is supplied into the combustion chamber 15.

The exhaust system 50 includes an exhaust manifold 51, an exhaust gas control catalyst 53 contained in a casing 52, and an exhaust pipe 54. The exhaust port 18 of each cylinder 11 communicates with the exhaust manifold 51, and the exhaust manifold 51 communicates with the casing 52 that contains the exhaust gas control catalyst 53. The casing 52 communicates with the exhaust pipe 54.

The exhaust gas control catalyst 53 is a device that removes uncombusted HC, CO, and NOx from the exhaust gas and then discharges the exhaust gas into the outside air. Examples of the exhaust gas control catalyst 53 include a three-way catalyst in which a noble metal catalyst, such as platinum, is supported on a carrier formed by cordierite. The exhaust gas control catalyst 53 may be a particulate filter having a function of collecting particulate matters as long as it has a noble metal catalyst and can remove uncombusted HC, CO, and NOx from the exhaust gas. The exhaust port 18, the exhaust manifold 51, the casing 52, and the exhaust pipe 54 form an exhaust gas passage through which exhaust gas is discharged from the combustion chamber 15.

The control device 60 includes an electronic control unit (ECU) 61 and various sensors. The ECU 61 includes a memory 62, a CPU (a microprocessor) 63, an input port 64, and an output port 65, which are connected to one another via bidirectional buses 66.

The control device 60 includes an air flow meter 71, a throttle opening degree sensor 72, a catalyst temperature sensor 73, a fuel property sensor 74, a coolant temperature sensor 75, a torque sensor 76, a load sensor 78, and a crank angle sensor 79. The air flow meter 71 is arranged in the intake-air pipe 43 and detects an air flow rate of the air flowing in the intake-air pipe 43. The throttle opening degree sensor 72 is provided in the throttle valve 45 and detects an opening degree of the throttle valve 45. In addition, the catalyst temperature sensor 73 is provided in the exhaust gas control catalyst 53 and detects the temperature of the exhaust gas control catalyst 53. The fuel property sensor 74 is provided in the fuel tank 34 and detects properties of fuel stored in the fuel tank 34. The coolant temperature sensor 75 is provided in the engine body 10 and detects the temperature of a coolant circulating in the engine body 10. Further, the torque sensor 76 is provided on a crankshaft or an output shaft of the internal combustion engine 1 and detects output torque of the internal combustion engine 1. Outputs of the air flow meter 71, the throttle opening degree sensor 72, the catalyst temperature sensor 73, the fuel property sensor 74, the coolant temperature sensor 75, and the torque sensor 76 are input to the input port 64 via corresponding AD converters 67.

Further, the load sensor 78 is connected to an accelerator pedal 77 and generates an output voltage proportional to a depression amount of the accelerator pedal 77. The output voltage of the load sensor 78 is input to the input port 64 as a signal indicating an engine load via the corresponding AD converter 67. The crank angle sensor 79 generates an output pulse every time the crankshaft rotates by, for example, 10 degrees, and the output pulse is input to the input port 64. The CPU 63 calculates an engine rotation speed from the output pulse of the crank angle sensor 79.

Meanwhile, the output port 65 is connected to the ignition plug 21, the fuel injection valve 31, and the throttle valve drive actuator 47 via corresponding drive circuits 68. Therefore, the ECU 61 functions as a control device that controls a timing of ignition by the ignition plug 21, a fuel injection timing or an amount of fuel injected from the fuel injection valve 31, the opening degree of the throttle valve 45, and the like.

Split Injection

The control device 60 of the internal combustion engine 1 according to the present embodiment can cause the fuel injection valve 31 to execute a split injection in which a plurality of fuel injections into each cylinder 11 is executed in one cycle. Hereinafter, the split injection will be briefly described with reference to FIG. 2A to FIG. 2C.

Figure 2A:
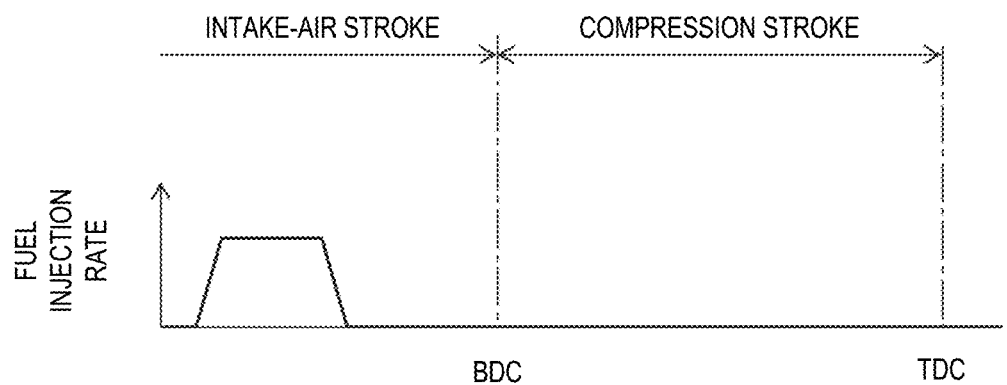
FIG. 2A is a diagram illustrating a transition of a rate of injection from a fuel injection valve from intake-air stroke to compression stroke in one cylinder.
Figure 2B:
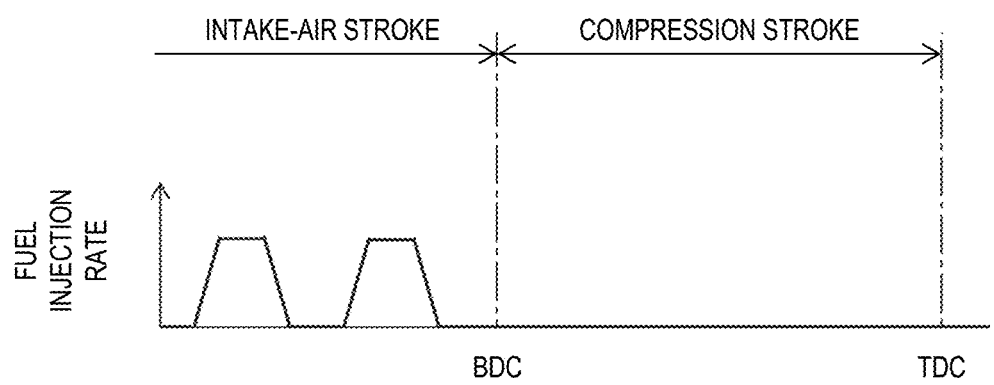
FIG. 2B is a diagram illustrating a transition of a rate of injection from a fuel injection valve from intake-air stroke to compression stroke in one cylinder.
Figure 2C:
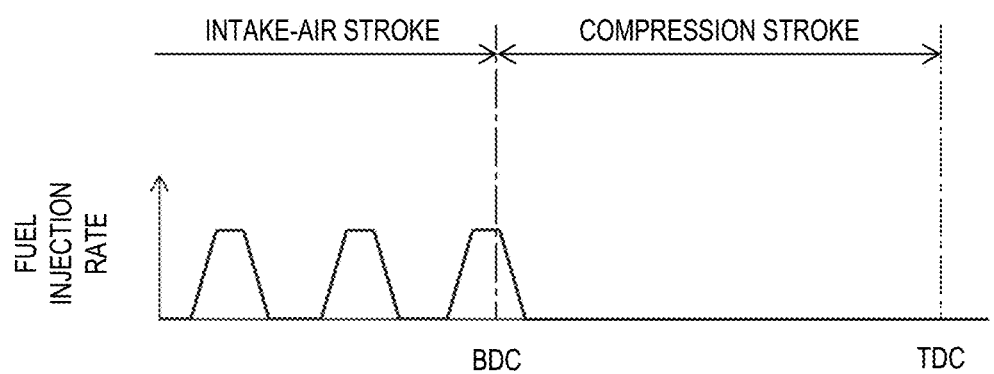
FIG. 2C is a diagram illustrating a transition of a rate of injection from a fuel injection valve from intake-air stroke to compression stroke in one cylinder.

FIG. 2A to FIG. 2C illustrate transitions of rates of injection from the fuel injection valve 31 from the intake-air stroke to the compression stroke in one cylinder 11, respectively. FIG. 2A illustrates a transition in a case where only one fuel injection into each cylinder 11 is executed in one cycle without the execution of the split injection. FIG. 2B illustrates a transition in a case where two fuel injections into each cylinder 11 are executed in one cycle by the execution of the split injection. Further, FIG. 2C illustrates a transition in a case where three fuel injections into each cylinder 11 are executed in one cycle by the execution of the split injection. In the examples illustrated in FIG. 2A to FIG. 2C, total fuel injection amounts per cycle are equal.

As illustrated in FIG. 2A, when only one fuel injection is executed, a time period during which a fuel injection rate is maximized is long. Since a large amount of fuel is injected from the fuel injection valve 31 at a high pressure when the fuel injection rate is high, the fuel that cannot be vaporized easily adheres to a wall surface of the cylinder 11. In particular, since the wall surface temperature of the cylinder 11 is low when the internal combustion engine 1 is cold-started, the fuel is easily liquefied near the wall surface of the cylinder 11, and it is difficult to vaporize the fuel adhering to the wall surface thereafter. As a result, when only one fuel injection is executed when the internal combustion engine 1 is cold-started, a part of the fuel adheres to the wall surface of the cylinder 11 and thus the vaporized fuel amount with respect to the injected fuel amount is decreased.

On the other hand, as illustrated in FIG. 2B or FIG. 2C, when a plurality of fuel injections is executed, the time period during which the fuel injection rate is high is shortened, and accordingly the amount of fuel adhering to the wall surface of the cylinder 11 is decreased. Therefore, the decrease in the vaporized fuel amount due to the adhesion of the fuel to the wall surface is restricted. This tendency is basically increased as the number of injections is increased. Therefore, as illustrated in FIG. 2C, when three fuel injections are executed, the amount of fuel adhering to the wall surface of the cylinder 11 can be further decreased, and accordingly the decrease in the vaporized fuel amount can be further restricted. For this reason, when the internal combustion engine 1 is cold-started, the split injection in which as many injections as possible are executed may be executed.

Figure 3:
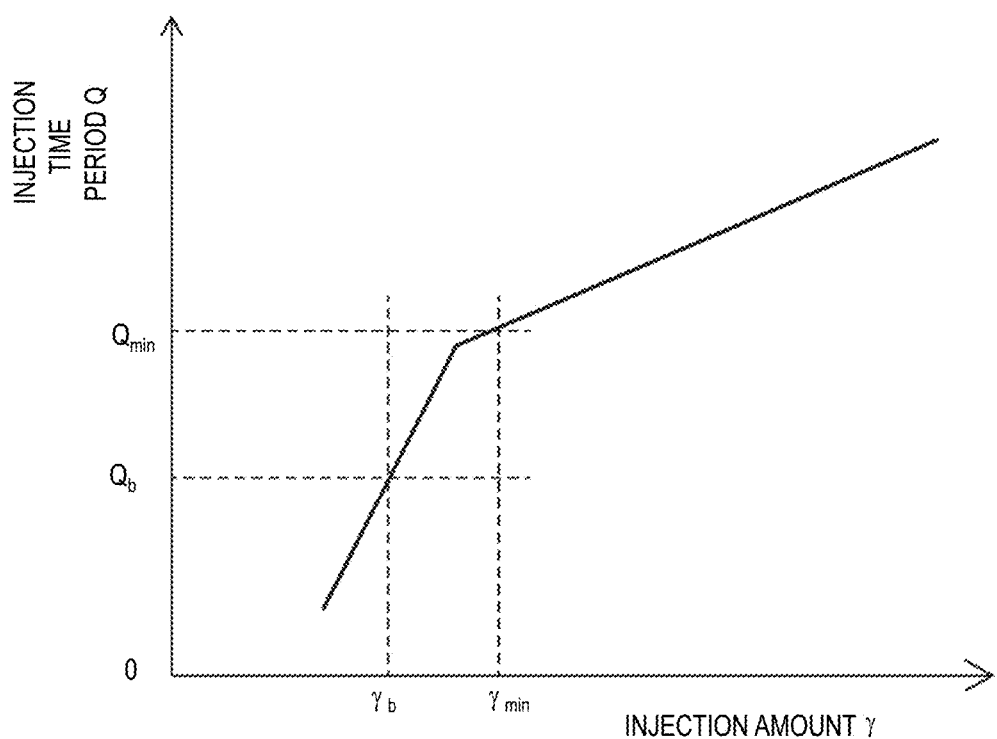
FIG. 3 is a graph illustrating a relationship between an injection time period and an injection amount in each fuel injection.

FIG. 3 is a graph illustrating a relationship between an injection time period and an injection amount in each fuel injection. An injection time period $\tau$ represents a time period during which an injection hole of the fuel injection valve 31 is opened and the fuel is injected from the fuel injection valve 31. As illustrated in FIG. 3, when the injection time period $\tau$ is shortened, a fuel injection amount Q is accordingly decreased. Thus, when the injection time period $\tau$ becomes shorter than a certain time period, an amount of change in the fuel injection amount Q with respect to an amount of change in the injection time period $\tau$ is increased. In this manner, when the amount of change in the fuel injection amount Q with respect to the amount of change in the injection time period $\tau$ is increased, the fuel injection amount Q is changed significantly even when the injection time period $\tau$ is deviated slightly. Thus, when the injection time period $\tau$ becomes shorter than the certain time period, the fuel injection amount Q cannot be accurately controlled. For this reason, when the split injection is executed, basically, the injection time period $\tau$ in one fuel injection is set to be equal to or greater than a predetermined minimum injection time period $\tau_{min}$ that is equal to or greater than the above-described certain time period. In other words, when the split injection is executed, a target fuel injection amount in one fuel injection is set to be equal to or greater than a minimum injection amount $Q_{min}$, which corresponds to the minimum injection time period $\tau_{min}$.

Ignition Retardation

When the internal combustion engine 1 is cold-started, the temperatures of not only the engine body 10 but also the exhaust gas control catalyst 53 are low. When the temperature of the exhaust gas control catalyst 53 becomes equal to or higher than the active temperature of a noble metal catalyst of the exhaust gas control catalyst 53, the harmful substances can be removed from the exhaust gas at a high removal rate. Therefore, from the viewpoint of removing the harmful substances from the exhaust gas, when the internal combustion engine 1 is cold-started, it is necessary to raise the temperature of the exhaust gas control catalyst 53 as quickly as possible.

The ignition timing by the ignition plug 21 is basically set to a minimum advance for the best torque (MBT). By igniting the air-fuel mixture at the MBT, combustion efficiency is maximized, and accordingly the output torque and fuel efficiency can be improved. On the other hand, when the ignition timing is more retarded than the MBT, a combustion timing of the air-fuel mixture is delayed, and the proportion of thermal energy that remains without being converted into kinetic energy in the thermal energy obtained by combustion is increased. As a result, when the ignition timing is retarded, the temperature of the exhaust gas discharged from the engine body 10 rises. Therefore, when the internal combustion engine 1 is cold-started, the ignition timing by the ignition plug 21 may be set to a timing on the side that is more retarded than the MBT.

Start-Up Control

Figure 4:
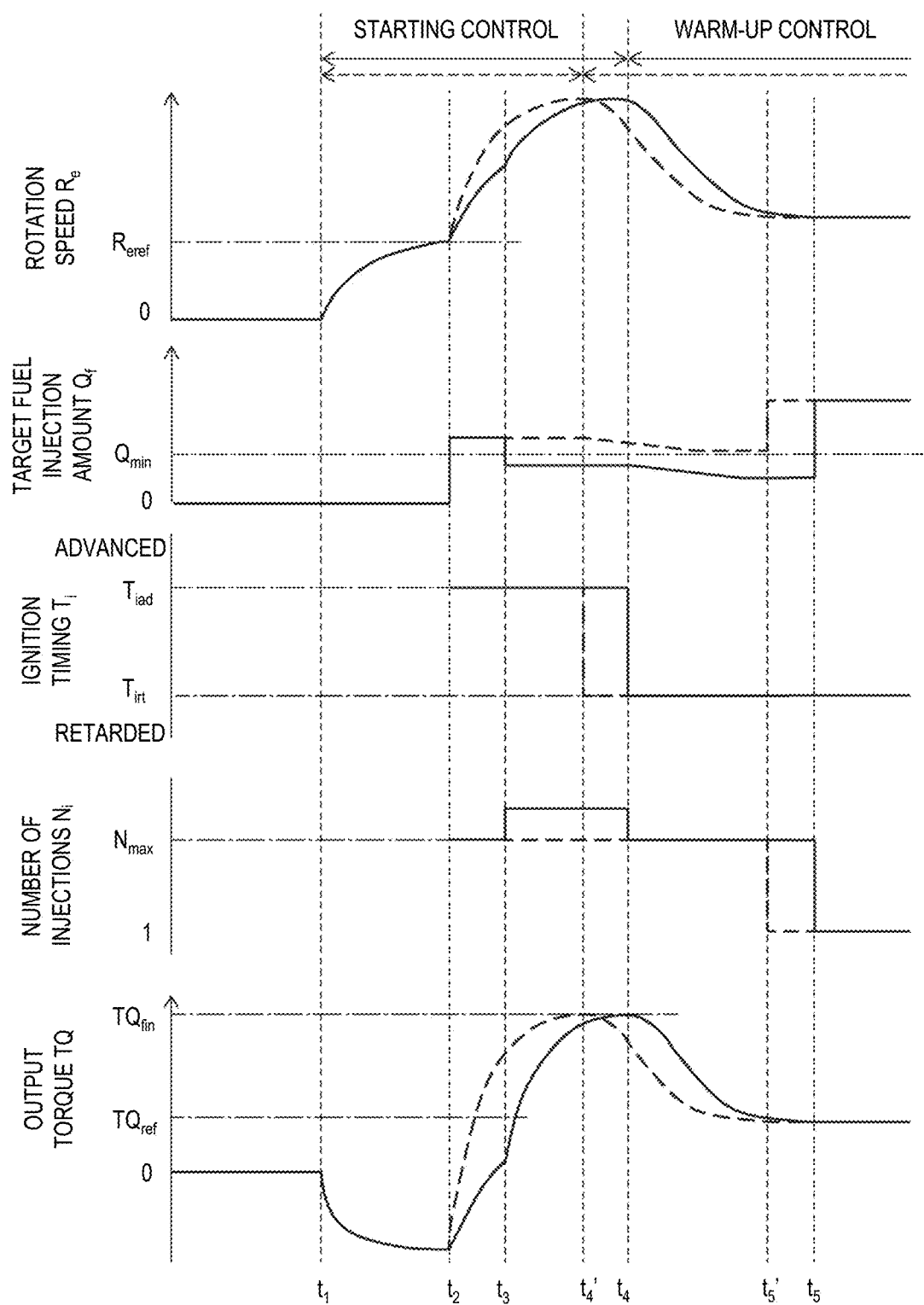
FIG. 4 is a time chart of various parameters when the internal combustion engine is cold-started.

A start-up control executed by the control device 60 according to the present embodiment will be described with reference to FIG. 4. FIG. 4 is a time chart of various parameters when the internal combustion engine 1 is cold-started. In particular, FIG. 4 is a time chart illustrating a rotation speed (the engine rotation speed) $R_e$ of the internal combustion engine 1, a target fuel injection amount $Q_f$ in each fuel injection (when a plurality of fuel injections into each cylinder 11 is being executed per cycle, one of the plurality of fuel injections), an ignition timing $T_i$ by the ignition plug 21, the number of fuel injections $N_i$ into each cylinder 11 per cycle, and output torque TQ of the internal combustion engine 1. A value of the output torque TQ of the internal combustion engine 1 is negative when the internal combustion engine 1 is being driven by the starter motor 22.

Further, startability of the internal combustion engine 1 is changed depending on properties of fuel used, the temperature of the engine body 10, and the like. The startability of the internal combustion engine 1 is changed depending on how easily the fuel used is vaporized. When the fuel used is light fuel, the startability is high, and when the fuel used is heavy fuel, the startability is low. Further, when the temperature of the engine body 10 is high, the startability is high, and when the temperature is low, the startability is low. In FIG. 4, dashed lines represent transitions in a case where the startability of the internal combustion engine 1 is high, and solid lines represent transitions in a case where the startability of the internal combustion engine 1 is low.

First, the case where the startability of the internal combustion engine 1 is sufficient (the dashed lines in FIG. 4) will be described. In an example illustrated in FIG. 4, the internal combustion engine 1 is stopped until time $t_1$, and accordingly values of the engine rotation speed $R_e$, the target fuel injection amount $Q_f$, and the output torque TQ are all zero. At time $t_1$, a starting control for starting the stopped internal combustion engine 1 is started. The starting control is executed for changing the internal combustion engine 1 from a state where the crankshaft is stopped to a state where rotation can be maintained by combustion of the air-fuel mixture.

At time $t_1$, when the starting control is started, first, the internal combustion engine 1 is driven by the starter motor 22. As a result, the engine rotation speed $R_e$ is increased, and, since the torque is transmitted from the starter motor 22 to the internal combustion engine 1, the value of the output torque TQ becomes negative. In the present embodiment, immediately after the starting control is started, neither the fuel injection from the fuel injection valve 31 nor the ignition by the ignition plug 21 is executed.

In the present embodiment, thereafter, at time $t_2$, when the engine rotation speed $R_e$ reaches a predetermined reference rotation speed $R_{eref}$, the fuel injection from the fuel injection valve 31 is started, and the ignition by the ignition plug 21 of the air-fuel mixture formed by the fuel injection is started. In the present embodiment, the fuel injection and the ignition are started when the engine rotation speed $R_e$ reaches the reference rotation speed $R_{eref}$, but the fuel injection and the ignition may be started at a different timing. For example, the fuel injection and the ignition may be started at the same time as when the driving by the starter motor 22 is started, or at the time after the crankshaft is rotated by the starter motor 22 only by a predetermined rotation amount.

In the present embodiment, during the starting control, the number of fuel injections $N_i$ from the fuel injection valve 31 into each cylinder 11 per cycle is set to the maximum number of injections $N_{max}$. Therefore, in the present embodiment, when the cold-starting of the internal combustion engine is started, the split injection control for executing a plurality of fuel injections into each cylinder 11 is executed in one cycle. Here, the maximum number of injections $N_{max}$ is the maximum number of injections within a range in which a fuel injection amount in each fuel injection becomes equal to or greater than the minimum injection amount $Q_{min}$. Therefore, when the number of fuel injections $N_i$ is set to the maximum number of injections $N_{max}$, the target fuel injection amount in one fuel injection becomes equal to or slightly greater than the minimum injection amount $Q_{min}$. As a result, during the starting control, basically, the fuel injected from the fuel injection valve 31 is restricted from adhering to the wall surface of each cylinder 11, such that atomization of the fuel is promoted.

Further, in the present embodiment, during the starting control, the ignition timing by the ignition plug 21 is set to a predetermined timing on the relatively advanced side (for example, a timing near the MBT, hereinafter referred to as an "advanced-side timing $T_{iad}$"). Therefore, the air-fuel mixture in the combustion chamber 15 can be combusted in a relatively stable state.

After time $t_2$, the air-fuel mixture is combusted in the combustion chamber 15, whereby the internal combustion engine 1 generates torque. For this reason, after time $t_2$, the output torque TQ is increased and accordingly the engine rotation speed $R_e$ is increased. As represented by the dashed lines in FIG. 4, in the case where the startability of the internal combustion engine 1 is high, the output torque TQ is sharply increased. For this reason, at time $t_3$ when any number of cycles (for example, 1 or 2 cycles) has been completed since the fuel injection and the ignition were started, the output torque TQ is equal to or greater than a reference torque $TQ_{ref}$. Here, the reference torque $TQ_{ref}$ at time $t_3$ is set such that the output torque TQ reaches it when the startability of the internal combustion engine 1 is sufficiently high and does not reach it when the startability is low and insufficient.

Thereafter, when the output torque TQ becomes equal to or greater than a predetermined torque which has a value equal to or greater than zero, the internal combustion engine 1 is in the state where the rotation can be maintained by combustion of the air-fuel mixture, and thus the starter motor 22 is stopped.

In the present embodiment, at time $t_4'$ when the output torque TQ reaches a starting completion torque $TQ_{fin}$, the starting control is ended and a warm-up control is started. The end of the starting control and the start of the warm-up control may be executed when the engine rotation speed $R_e$ reaches a predetermined rotation speed equal to or greater than an idling rotation speed, or when any number of cycles (for example, 2 or 3 cycles) has been completed since it was determined that the startability of the internal combustion engine 1 is high at time $t_3$.

The warm-up control is executed for raising the temperatures of the engine body 10 and the exhaust gas control catalyst 53 at an early stage. Therefore, at time $t_4'$ when the warm-up control is started, the ignition timing $T_i$ by the ignition plug 21 is retarded from the advanced-side timing $T_{iad}$ to a predetermined timing on the relatively retarded side (hereinafter referred to as a "retarded-side timing $T_{irt}$"). Here, the retarded-side timing $T_{irt}$ is set to a timing as far as possible on the retarded side within a range in which combustion can be maintained at, for example, 15° ATDC. As a result, after time $t_4'$, the temperature of the exhaust gas rises and accordingly the temperature of the exhaust gas control catalyst 53 rises.

Further, in the present embodiment, at time $t_5'$ when any number of cycles (for example, 2 or 3 cycles) has been completed since the warm-up control was started, that is, since the ignition timing $T_i$ by the ignition plug 21 was retarded, the number of fuel injections $N_i$ from the fuel injection valve 31 is decreased from the maximum number of injections $N_{max}$ to the minimum number of injections (for example, one injection). As a result, the target fuel injection amount in each fuel injection is increased.

Thereafter, the warm-up control is ended when, for example, the temperature of the exhaust gas control catalyst 53 rises to the active temperature. When the warm-up control is ended, the start-up control of the internal combustion engine 1 is ended, and a normal control is started. In the normal control, the ignition timing and the number of fuel injections $N_i$ from the fuel injection valve 31 are set based on the engine rotation speed $R_e$ and the engine load. In particular, in the present embodiment, during operations including the normal control and excluding the start-up of the internal combustion engine, one or a plurality of fuel injections is executed in each cycle such that the target fuel injection amount in one injection becomes equal to or greater than a predetermined minimum injection amount.

On the other hand, as represented by the solid lines in FIG. 4, in the case where the startability of the internal combustion engine 1 is low, the output torque TQ is increased slowly even after the fuel injection and the ignition are started at time $t_2$, and accordingly the engine rotation speed $R_e$ is increased slowly. As a result, at time $t_3$ when any number of cycles has been completed since the fuel injection and the ignition were started, the output torque TQ is less than the reference torque $TQ_{ref}$.

In the present embodiment, since the startability is insufficient when the output torque TQ is less than the reference torque $TQ_{ref}$ at time $t_3$, the number of fuel injections $N_i$ into each cylinder 11 per cycle becomes greater than the maximum number of injections $N_{max}$ as represented by the solid lines in FIG. 4. Here, a target total fuel injection amount (a sum of the target fuel injection amounts of the plurality of fuel injections) into each cylinder 11 per cycle is also maintained. Therefore, after time $t_3$, the target fuel injection amount in each fuel injection of the split injection becomes smaller than the minimum injection amount $Q_{min}$. For example, as illustrated in FIG. 3, at this time, the fuel injection time period in each fuel injection is set to $\tau_b$, which is shorter than the minimum injection time period $\tau_{min}$, such that the target fuel injection amount in each fuel injection r becomes $Q_b$, which is smaller than the minimum injection amount $Q_{min}$. In other words, after time $t_3$, an excess split injection control for executing more fuel injections than the maximum number of injections $N_{max}$ per cycle is executed while making the target fuel injection amount in each fuel injection smaller than the minimum injection amount $Q_{min}$.

In particular, in the present embodiment, during the excess split injection control, the number of fuel injections $N_i$ into each cylinder 11 per cycle is one more fuel injection than the maximum number of injections $N_{max}$. However, during the excess split injection control, the number of fuel injections $N_i$ may be two or more greater than the maximum number of injections $N_{max}$. However, since the fuel injection amount in one fuel injection is decreased when the number of injections is increased too much, a variation between the fuel injection amounts may be increased too much and, at the time of the fuel injection, it may be difficult to atomize fuel spray from the injection hole without increasing the fuel pressure in the injection hole of the fuel injection valve 31. Therefore, the number of fuel injections $N_i$ into each cylinder 11 per cycle may be one more fuel injection than the maximum number of injections $N_{max}$.

When the number of fuel injections $N_i$ into each cylinder 11 per cycle becomes greater than the maximum number of injections $N_{max}$ at time $t_3$, the amount of fuel adhering to the wall surface of the cylinder 11 is decreased, and accordingly the vaporized fuel amount is increased. As a result, since the air-fuel mixture is easily combusted, the startability of the internal combustion engine 1 is improved, such that, after time $t_3$, a speed of an increase in the output torque TQ becomes faster, and a speed of an increase in the engine rotation speed $R_e$ also becomes faster.

Thereafter, at time $t_4$ when the output torque TQ reaches the starting completion torque $TQ_{fin}$, the start-up control is ended and the warm-up control is started. With the end of the starting control, the excess split injection control is ended, and accordingly the number of fuel injections $N_i$ into each cylinder 11 per cycle is set to the maximum number of injections $N_{max}$. Further, with the start of the warm-up control, the ignition timing $T_i$ is retarded from the advanced-side timing $T_{iad}$ to the retarded-side timing $T_{irt}$. Thereafter, at time $t_5$ when any number of cycles has been completed since the warm-up control was started, the number of fuel injections $N_i$ from the fuel injection valve 31 is decreased from the maximum number of injections $N_{max}$ to the minimum number of injections (for example, one injection).

Flow of Start-Up Control

Figure 5:
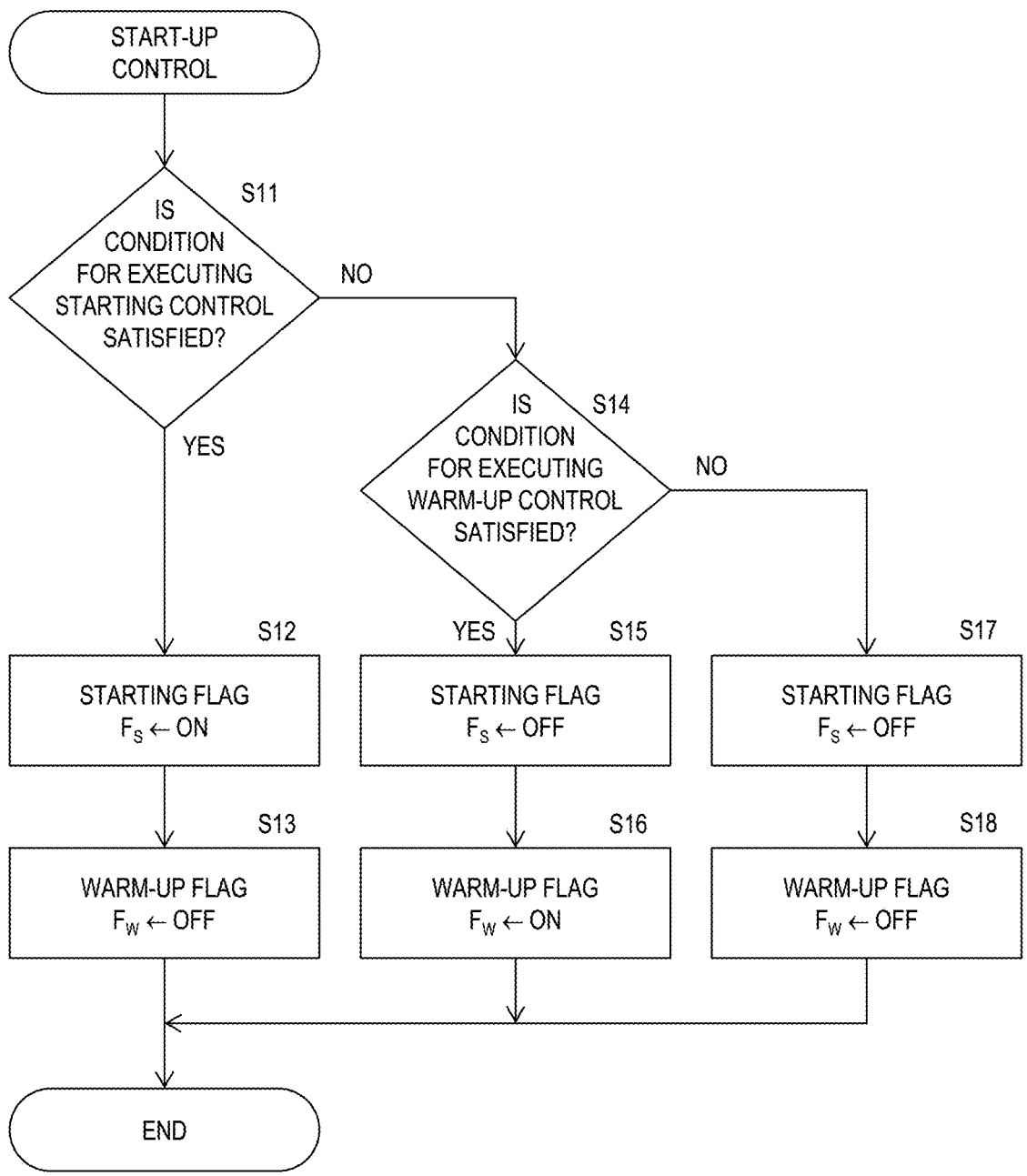
FIG. 5 is a flowchart illustrating a control routine for determining a control to be executed in a start-up control.

Next, a flow of the start-up control executed by the control device 60 according to the present embodiment will be described with reference to FIGS. 5 to 8. FIG. 5 is a flowchart illustrating a control routine for determining a control to be executed in the start-up control. The ECU 61 executes the illustrated control routine at regular time intervals.

With reference to FIG. 5, first, in step S11, the ECU 61 determines whether a condition for executing the starting control is satisfied. The condition for executing the starting control is satisfied from when a condition for starting the starting control is satisfied to when a condition for completing the starting control is satisfied. The condition for starting the starting control is satisfied in a case where, for example, an ignition switch of a vehicle having the internal combustion engine 1 mounted thereon is turned on or in a case where the ECU 61 determines to automatically start up the internal combustion engine 1 because a battery needs to be charged. On the other hand, the condition for ending the starting control is satisfied in a case where, for example, the output torque detected by the torque sensor 76 becomes equal to or greater than the starting completion torque $TQ_{fin}$. In step S11, when the ECU 61 determines that the condition for executing the starting control is satisfied, the control routine proceeds to steps S12 and S13. On the other hand, in step S11, when the ECU 61 determines that the condition for executing the starting control is not satisfied, the control routine proceeds to step S14.

In step S12, a starting flag $F_s$ is set to ON. The starting flag $F_s$ is set to ON during the execution of the starting control and is set to OFF at other times. Next, in step S13, a warm-up flag $F_w$ is set to OFF. The warm-up flag $F_w$ is set to ON during the execution of the warm-up control and is set to OFF at other times.

In step S14, the ECU 61 determines whether a condition for executing the warm-up control is satisfied. The condition for executing the warm-up is satisfied in a case where, for example, the temperature of the coolant of the internal combustion engine 1 detected by the coolant temperature sensor 75 is lower than a predetermined warm-up completion temperature, or in a case where the temperature of the exhaust gas control catalyst 53 detected by the catalyst temperature sensor 73 is lower than the active temperature.

In step S14, when the ECU 61 determines that the condition for executing the warm-up control is satisfied, the control routine proceeds to steps S15 and S16. In step S15, the starting flag $F_s$ is set to OFF, and in step S16, the warm-up flag $F_w$ is set to ON. On the other hand, in step S14, when the ECU 61 determines that the condition for executing the warm-up control is not satisfied, the control routine proceeds to steps S17 and S18. In step S17, the starting flag $F_s$ is set to OFF, and in step S18, the warm-up flag $F_w$ is set to OFF.

Figure 6:
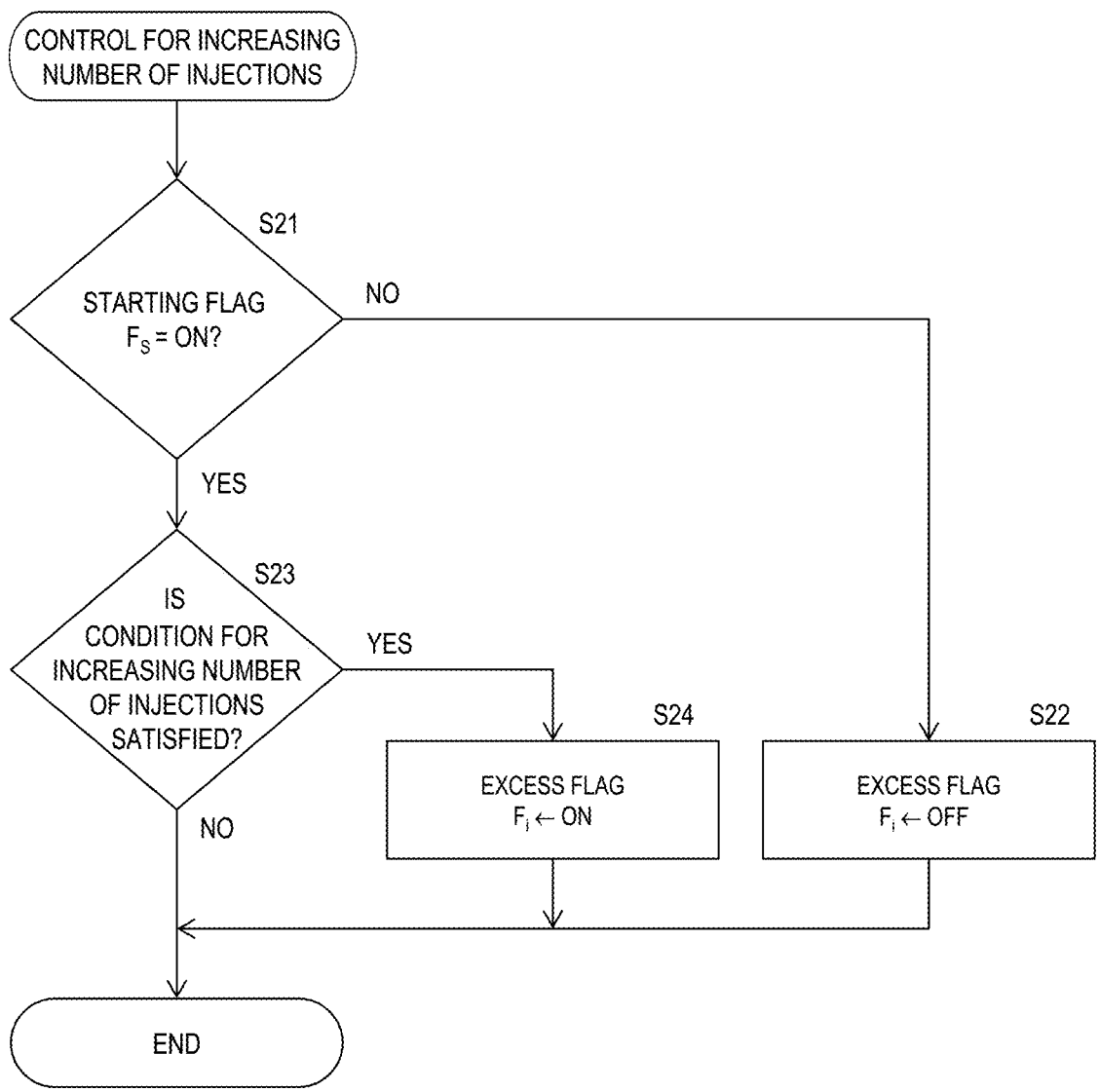
FIG. 6 is a flowchart illustrating a control routine for determining whether to increase the number of fuel injections into each cylinder per cycle during a starting control.

FIG. 6 is a flowchart illustrating a control routine for determining whether to increase the number of fuel injections $N_i$ into each cylinder 11 in one cycle during the starting control. The ECU 61 executes the illustrated control routine at regular time intervals.

First, in step S21, the ECU 61 determines whether the starting flag $F_s$ is set to ON. When the ECU 61 determines that the starting flag $F_s$ is set to OFF, the control routine proceeds to step S22. In step S22, an excess flag $F_i$ is set to OFF. The excess flag $F_i$ is set to ON when the excess split injection control is executed and the number of fuel injections $N_i$ into each cylinder 11 per cycle is greater than the maximum number of injections $N_{max}$, and is set to OFF at other times. On the other hand, in step S21, when the ECU 61 determines that the starting flag $F_s$ is set to ON, the control routine proceeds to step S23.

In step S23, the ECU 61 determines whether a condition for increasing the number of fuel injections $N_i$ into each cylinder 11 per cycle to be greater than the maximum number of injections $N_{max}$ (hereinafter, referred to as a "condition for increasing the number of injections") is satisfied. The condition for increasing the number of injections is satisfied when, for example, the output torque detected by the torque sensor 76 is less than the reference torque $TQ_{ref}$ in a case where any number of cycles has been completed (for example, at time $t_3$ of FIG. 4) since the starting flag $F_s$ was switched to ON.

The condition for increasing the number of injections is not necessarily limited to the above-described condition. The condition for increasing the number of injections may be, for example, a condition in which the engine rotation speed $R_e$ calculated based on the output of the crank angle sensor 79 reaches the reference rotation speed $R_{eref}$ that is reached when the reference torque $TQ_{ref}$ is output. Therefore, in the present embodiment, when the internal combustion engine 1 is started up, whether the startability is insufficient is determined based on the output torque TQ of the internal combustion engine 1 or the engine rotation speed $R_e$ after a predetermined cycle has passed since the fuel injection was started. In any case, the condition for increasing the number of injections may be any condition as long as it is satisfied in the case where the startability of the internal combustion engine 1 is insufficient even when the maximum number of fuel injections is executed per cycle within a range where the target fuel injection amount in one injection becomes equal to or greater than the minimum injection amount.

Alternatively, the condition for increasing the number of injections may be a condition in which satisfaction is determined based on the temperature of the coolant detected by the coolant temperature sensor 75 and fuel properties detected by the fuel property sensor 74. Specifically, for example, the condition for increasing the number of injections is satisfied in a case where the fuel property sensor 74 detects a fact that the fuel in the fuel tank 34 is heavy fuel, and in a case where the temperature of the coolant is equal to or lower than a predetermined first temperature (a temperature lower than the warm-up completion temperature). Therefore, in the present embodiment, whether the startability of the internal combustion engine 1 is insufficient is expected based on the properties of the fuel supplied to the internal combustion engine 1 and the temperature of the internal combustion engine 1. In any case, the condition for increasing the number of injections may be any condition as long as it is satisfied in the case where the startability of the internal combustion engine 1 is expected to be insufficient even when the maximum number of fuel injections is executed per cycle within the range where the target fuel injection amount in one injection becomes equal to or greater than the minimum injection amount.

In step S23, when the ECU 61 determines that the condition for increasing the number of injections is not satisfied, the control routine is ended. On the other hand, in step S23, when the ECU 61 determines that the condition for increasing the number of injections is satisfied, the control routine proceeds to step S24, and the excess flag $F_i$ is set to ON.

Figure 7:
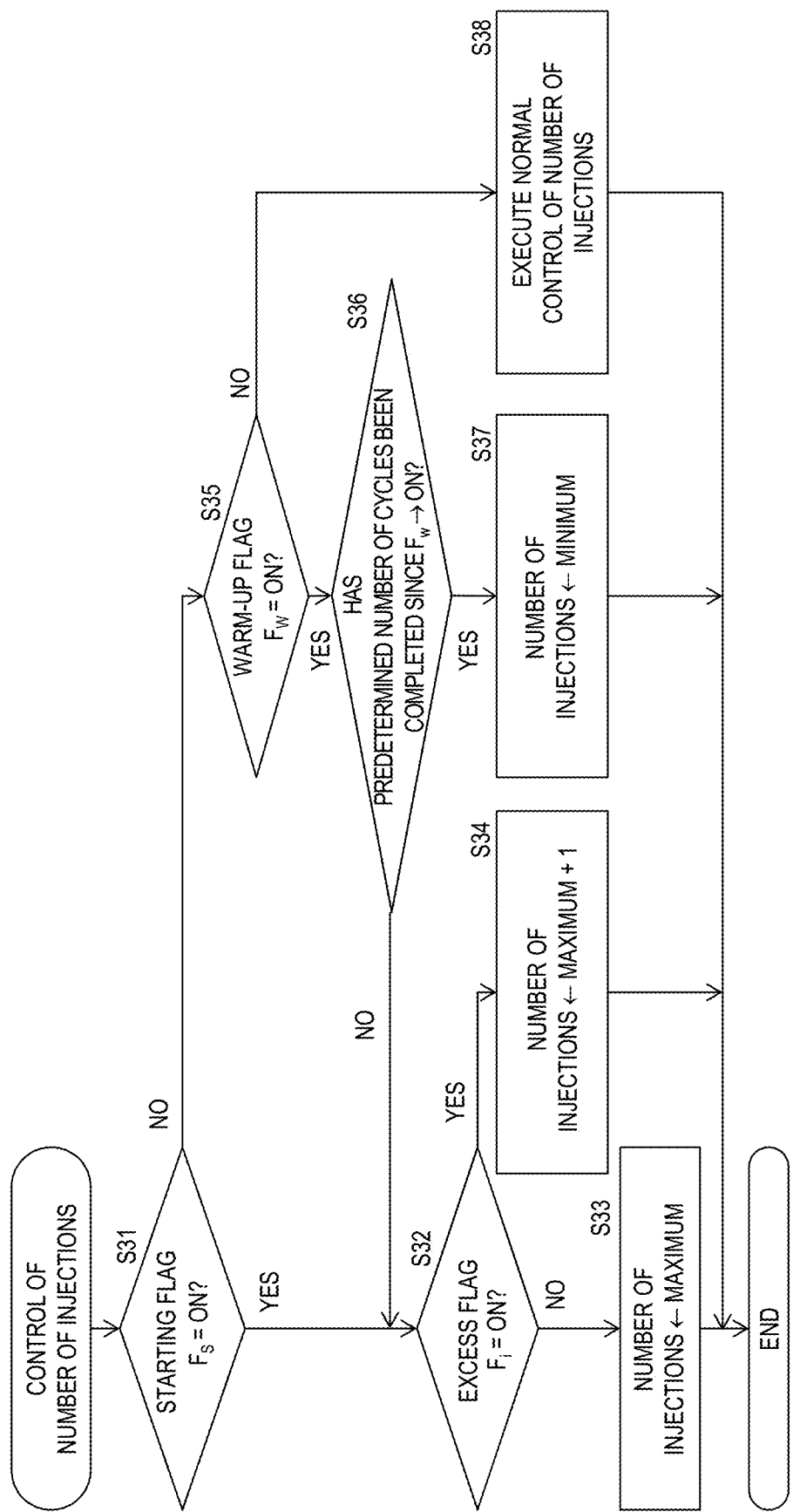
FIG. 7 is a flowchart illustrating a control routine for controlling the number of fuel injections by the fuel injection valve.

FIG. 7 is a flowchart illustrating a control routine for controlling the number of fuel injections $N_i$ by the fuel injection valve 31. The ECU 61 executes the illustrated control routine at regular time intervals.

As illustrated in FIG. 7, first, in step S31, the ECU 61 determines whether the starting flag $F_s$ is set to ON, that is, whether the starting control is being executed. When the starting flag $F_s$ is set to ON, the control routine proceeds to step S32. In step S32, the ECU 61 determines whether the excess flag $F_i$ is set to ON. When the ECU 61 determines that the excess flag $F_i$ is set to OFF, the control routine proceeds to step S33. In step S33, the number of fuel injections $N_i$ into each cylinder 11 per cycle is set to the maximum number of injections $N_{max}$. On the other hand, in step S32, when the ECU 61 determines that the excess flag $F_i$ is set to ON, the control routine proceeds to step S34. In step S34, the number of fuel injections $N_i$ into each cylinder 11 per cycle is set to be one more fuel injection than the maximum number of injections $N_{max}$.

On the other hand, in step S31, when the ECU 61 determines that the starting flag $F_s$ is set to OFF, the control routine proceeds to step S35. In step S35, the ECU 61 determines whether the warm-up flag $F_w$ is set to ON, that is, whether the warm-up control is being executed. When the ECU 61 determines that the warm-up flag $F_w$ is set to ON, the control routine proceeds to step S36. In step S36, the ECU 61 determines whether a predetermined number of cycles (for example, 2 or 3 cycles) has been completed since the warm-up flag $F_w$ was switched to ON. In step S36, when the ECU 61 determines that the predetermined number of cycles has not been completed since the warm-up flag $F_w$ was switched to ON, the control routine proceeds to step S32. On the other hand, in step S36, when the ECU 61 determines that the predetermined number of cycles has been completed since the warm-up flag $F_w$ was switched to ON, the control routine proceeds to step S37. In step S37, the number of fuel injections $N_i$ into each cylinder 11 per cycle is set to the minimum number of injections.

On the other hand, in step S35, when the ECU 61 determines that the warm-up flag $F_w$ is set to OFF, the control routine proceeds to step S38. In step S38, the normal control is executed, and the number of fuel injections $N_i$ into each cylinder 11 per cycle is set based on the engine rotation speed $R_e$, which is calculated based on the output of the crank angle sensor 79, and the engine load, which is detected by the load sensor 78.

Figure 8:
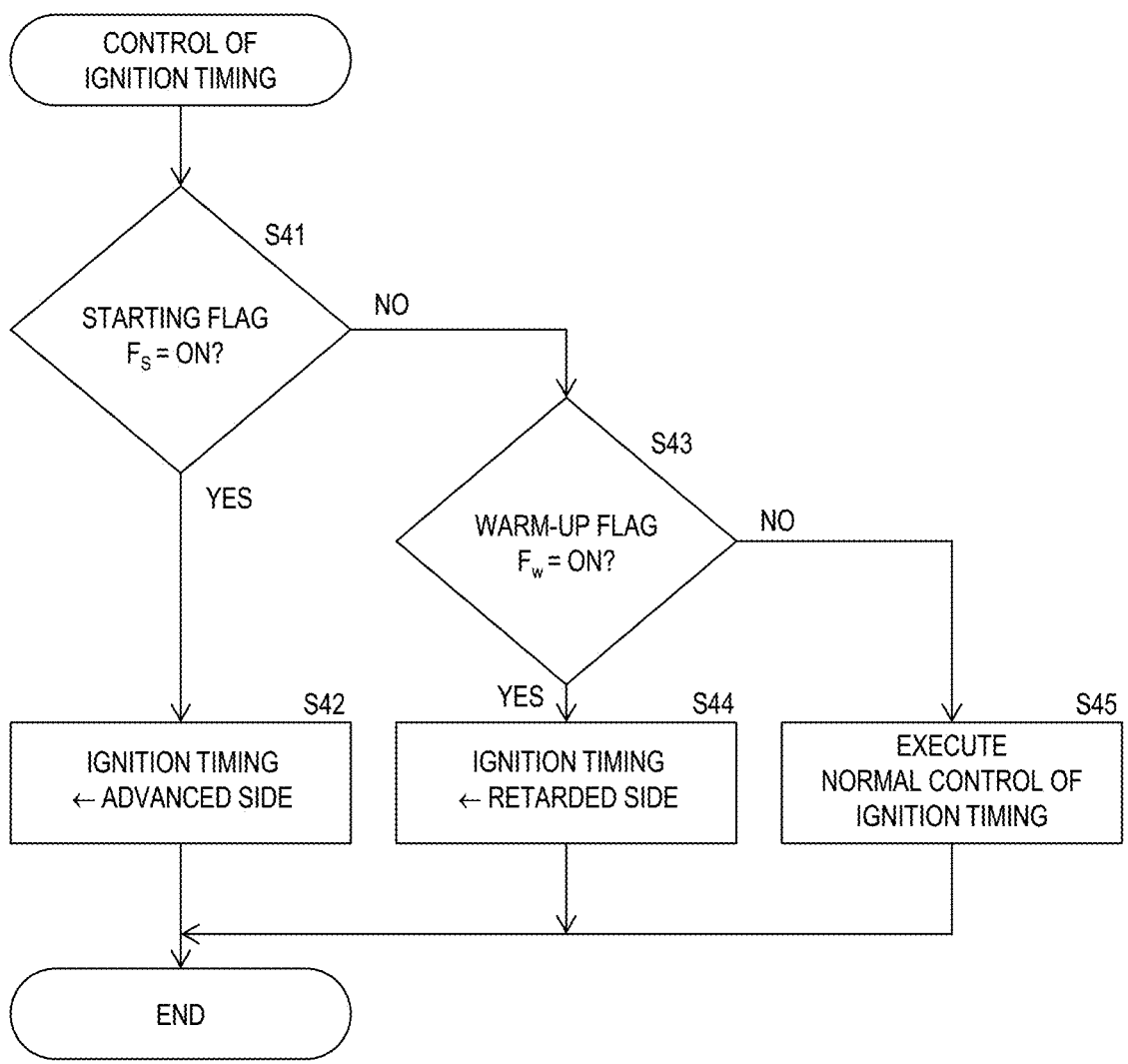
FIG. 8 is a flowchart illustrating a control routine for controlling a timing of ignition by an ignition plug.

FIG. 8 is a flowchart illustrating a control routine for controlling the ignition timing by the ignition plug 21. The ECU 61 executes the illustrated control routine at regular time intervals.

As illustrated in FIG. 8, first, in step S41, the ECU 61 determines whether the starting flag $F_s$ is set to ON. When the starting flag $F_s$ is set to ON, the control routine proceeds to step S42. In step S42, the ignition timing is set to the advanced-side timing $T_{iad}$. On the other hand, in step S41, when the ECU 61 determines that the starting flag $F_s$ is set to OFF, the control routine proceeds to step S43.

In step S43, the ECU 61 determines whether the warm-up flag $F_w$ is set to ON. When the ECU 61 determines that the warm-up flag $F_w$ is set to ON, the control routine proceeds to step S44. In step S44, the ignition timing is set to the retarded-side timing $T_{irt}$. On the other hand, in step S43, when the ECU 61 determines that the warm-up flag $F_w$ is set to OFF, the control routine proceeds to step S45. In step S45, the normal control is executed and the ignition timing is set based on the engine speed, which is calculated based on the output of the crank angle sensor 79, and the engine load, which is detected by the load sensor 78.

ADVANTAGEOUS EFFECT

In the above-described embodiment, when the internal combustion engine 1 is cold-started, the number of fuel injections $N_i$ into each cylinder 11 per cycle is basically set to the maximum number of injections $N_{max}$. However, thereafter, when the startability of the internal combustion engine 1 is still insufficient, the number of fuel injections $N_i$ into each cylinder 11 per cycle is set to be greater than the maximum number of injections $N_{max}$. Therefore, atomization of the injected fuel can be promoted, and accordingly the startability of the internal combustion engine 1 can be improved. In particular, in the present embodiment, since the target total fuel injection amount per cycle is not increased, an amount of uncombusted HC and the like in the exhaust gas is not increased, and accordingly the startability of the internal combustion engine 1 can be improved while restricting the deterioration of emission of the exhaust gas.

Further, in the present embodiment, by increasing the number of fuel injections $N_i$ into each cylinder 11 per cycle, the target fuel injection amount in each fuel injection becomes smaller than the minimum injection amount. As a result, a variation between the target fuel injection amount and an actual fuel injection amount in each fuel injection occurs. However, since the output torque greatly fluctuates at the time of the starting of the internal combustion engine 1, even when the torque fluctuation occurs due to a slight variation between the fuel injection amounts, it is difficult for an occupant to sense the variation. Further, since the actual fuel injection amount becomes close to the target fuel injection amount on average even when the variation between the actual fuel injection amount and the target fuel injection amount occurs, the total fuel injection amount into each cylinder 11 per cycle also becomes close to the total fuel injection amount when each fuel injection amount is set to be equal to or greater than the minimum injection amount.

Second Embodiment

Next, the control device 60 according to a second embodiment will be described with reference to FIGS. 9 to 11. Hereinafter, differences from the control device according to the first embodiment will be mainly described.

Figure 9:
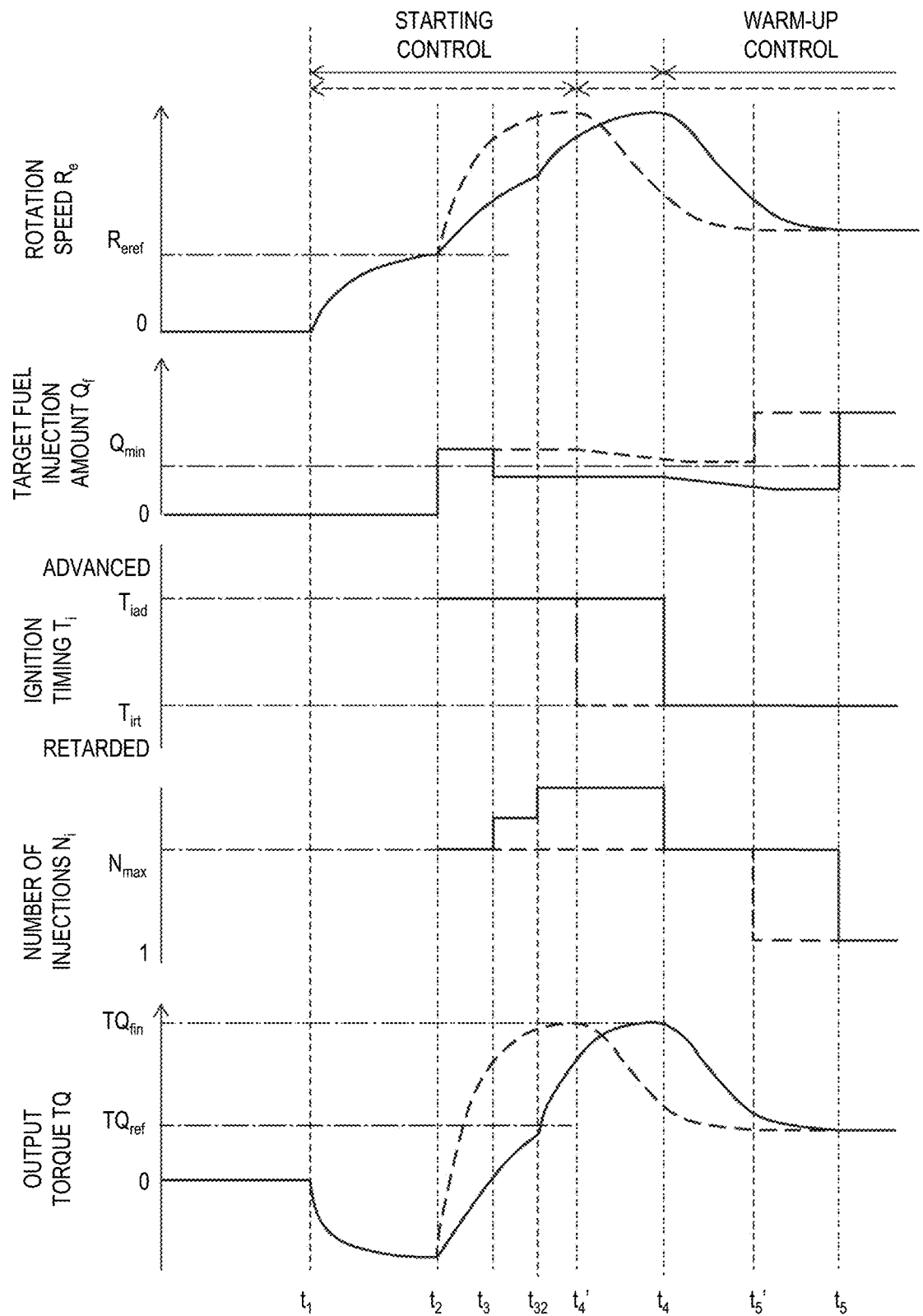
FIG. 9 is a time chart of various parameters when the internal combustion engine is cold-started, similar to FIG. 4.
Figure 10:
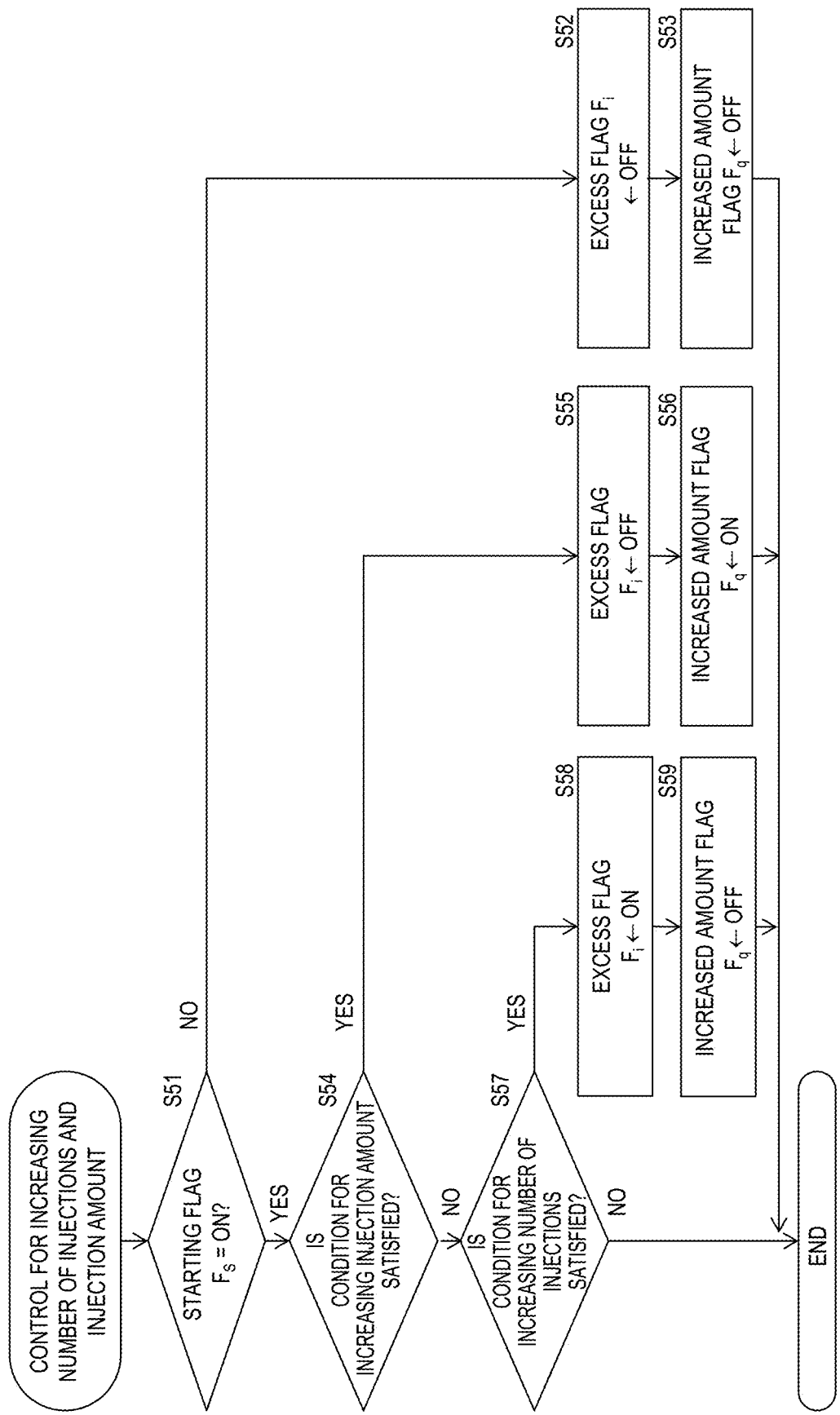
FIG. 10 is a flowchart illustrating a control routine for determining whether to increase the number of fuel injections into each cylinder per cycle and whether to increase the injection amount during the starting control.

FIG. 9 is a time chart of various parameters when the internal combustion engine 1 is cold-started, similar to FIG. 4. In the same manner as in FIG. 4, in FIG. 9, dashed lines represent transitions in a case where the startability of the internal combustion engine 1 is high, and solid lines represent transitions in a case where the startability of the internal combustion engine 1 is low.

In the same manner as in FIG. 4, in the example of FIG. 9, at time $t_2$, the fuel injection and the ignition are started. However, in the example represented by the solid lines, the startability of the internal combustion engine 1 is low. Therefore, at time $t_3$, the output torque TQ is less than the reference torque $TQ_{ref}$. For this reason, in the present embodiment as well, at time $t_3$, the excess split injection control for increasing the number of fuel injections $N_i$ to be greater than the maximum number of injections $N_{max}$ into each cylinder 11 per cycle is started.

However, in the example represented by the solid lines, even when the excess split injection control is started at time $t_3$, thereafter, the speed of the increase in the output torque TQ is not increased much. As a result, even at time $t_{32}$ when any number of cycles (for example, 1 or 2 cycles) has been completed since time $t_3$, the output torque TQ is still less than the reference torque $TQ_{ref}$.

In the present embodiment, when the output torque TQ is less than the reference torque $TQ_{ref}$ at time $t_{32}$, the startability of the internal combustion engine 1 is still insufficient even when the excess split injection control is executed, and thus the number of fuel injections $N_i$ into each cylinder 11 per cycle is further increased as represented by the solid lines in FIG. 9. Further, at this time, the same target fuel injection amount in each fuel injection as in the split injection is maintained. Therefore, at this time, the target total fuel injection amount into each cylinder 11 per cycle is increased. In other words, after time $t_{32}$, an increased amount split injection control for executing the number of fuel injections $N_i$ which is greater than that in the excess split injection control while maintaining the same target fuel injection amount per injection as in the excess split injection control is executed.

In particular, in the present embodiment, the number of fuel injections into each cylinder 11 per cycle during the increased amount split injection control is set to be one more than the number of fuel injections $N_i$ during the excess split injection control, that is, two more than the maximum number of injections $N_{max}$. However, the number of fuel injections $N_i$ during the increased amount split injection control may be two or more greater than the number of fuel injections $N_i$ during the excess split injection control.

At time $t_{32}$, since the target total fuel injection amount per cycle is increased when the number of fuel injections $N_i$ into each cylinder 11 per cycle becomes further greater than the maximum number of injections $N_{max}$, the vaporized fuel amount is increased. As a result, since the air-fuel mixture is easily combusted, the startability of the internal combustion engine 1 is improved. Accordingly, after time $t_{32}$, the speed of the increase in the output torque TQ becomes faster, and the speed of the increase in the engine rotation speed $R_e$ also becomes faster.

At time $t_{32}$, it can also be considered that the number of fuel injections $N_i$ into each cylinder 11 per cycle is increased by decreasing the target fuel injection amount in one fuel injection without increasing the target total fuel injection amount into each cylinder 11 per cycle. However, as described above, when the fuel injection amount in one fuel injection is decreased too much, a variation between the fuel injection amounts may be increased excessively and the atomization of the fuel spray may become insufficient. In the present embodiment, since the target fuel injection amount in each fuel injection is maintained, it is possible to restrict the variation between the fuel injection amounts from increasing excessively and the atomization of the fuel spray from being insufficient.

Thereafter, at time $t_4$ when the output torque TQ reaches the starting completion torque $TQ_{fin}$, the starting control is ended and the warm-up control is started. With the end of the starting control, the excess split injection control is ended, and accordingly the number of fuel injections $N_i$ into each cylinder 11 per cycle is set to the maximum number of injections $N_{max}$.

Next, a flow of a start-up control executed by the control device 60 according to the second embodiment will be described with reference to FIGS. 10 and 11. FIG. 10 is a flowchart illustrating a control routine for determining whether to increase the number of fuel injections $N_i$ into each cylinder 11 per cycle and whether to increase the injection amount during the starting control. The ECU 61 executes the illustrated control routine at regular time intervals.

First, in step S51, the ECU 61 determines whether the starting flag $F_s$ is set to ON. When the ECU 61 determines that the starting flag $F_s$ is set to OFF, the control routine proceeds to steps S52 and S53. In step S52, the excess flag $F_i$ is set to OFF, and in step S53, an increased amount flag $F_q$ is set to OFF. The increased amount flag $F_q$ is set to ON when the increased amount split injection control is executed and the number of fuel injections $N_i$ into each cylinder 11 per cycle is set to be greater than that during the excess split injection control, and is set to OFF at other times. On the other hand, in step S51, when the ECU 61 determines that the starting flag $F_s$ is set to ON, the control routine proceeds to step S54.

In step S54, when the ECU 61 determines whether a condition for increasing the number of injections while maintaining the same target fuel injection amount per fuel injection as in the excess split injection control (hereinafter, referred to as a "condition for increasing the injection amount") is satisfied. The condition for increasing the injection amount is satisfied when, for example, the output torque detected by the torque sensor 76 is less than the reference torque $TQ_{ref}$ in a case where any number of cycles has been completed since the condition for increasing the number of injections was satisfied (for example, at time $t_{32}$ of FIG. 4).

The condition for increasing the injection amount is not necessarily limited to the above-described condition. The condition for increasing the injection amount may be, for example, a condition in which the engine rotation speed $R_e$ calculated based on the output of the crank angle sensor 79 reaches the reference rotation speed $R_{eref}$ that is reached when the reference torque $TQ_{ref}$ is output. Therefore, in the present embodiment, whether the startability of the internal combustion engine 1 is insufficient is determined based on the output torque TQ of the internal combustion engine 1 or the engine rotation speed $R_e$ after a predetermined cycle has passed since the excess split injection control was started. In any case, the condition for increasing the injection amount may be any condition as long as it is satisfied in the case where the startability of the internal combustion engine 1 is insufficient even when the excess split injection control is executed.

Further, the condition for increasing the injection amount may be a condition in which satisfaction is determined based on the temperature of the coolant detected by the coolant temperature sensor 75 and fuel properties detected by the fuel property sensor 74. Specifically, for example, when the fuel property sensor 74 detects a fact that the fuel in the fuel tank 34 is heavy fuel, and the temperature of the coolant is equal to or lower than a predetermined second temperature (a temperature lower than the first temperature), the condition for increasing the injection amount is satisfied. Therefore, in the present embodiment, whether the startability of the internal combustion engine 1 is insufficient is expected based on the properties of the fuel supplied to the internal combustion engine 1 and the temperature of the internal combustion engine 1. In any case, the condition for increasing the number of injections may be any condition as long as it is satisfied in the case where the startability of the internal combustion engine 1 is expected to be insufficient even when the excess split injection control is executed.

In step S54, when the ECU 61 determines that the condition for increasing the injection amount is satisfied, the control routine proceeds to steps S55 and S56. In step S55, the excess flag $F_i$ is set to OFF, and in step S53, the increased amount flag $F_q$ is set to ON. On the other hand, in step S54, when the ECU 61 determines that the condition for increasing the injection amount is not satisfied, the control routine proceeds to step S57.

In the same manner as in step S23, in step S57, the ECU 61 determines whether the condition for increasing the number of injections is satisfied. In step S57, when the ECU 61 determines that the condition for increasing the number of injections is satisfied, the control routine proceeds to steps S58 and S59. In step S58, the excess flag $F_i$ is set to ON, and in step S59, the increased amount flag $F_q$ is set to OFF. On the other hand, in step S57, when the ECU 61 determines that the condition for increasing the number of injections is not satisfied, the control routine is ended.

Figure 11:
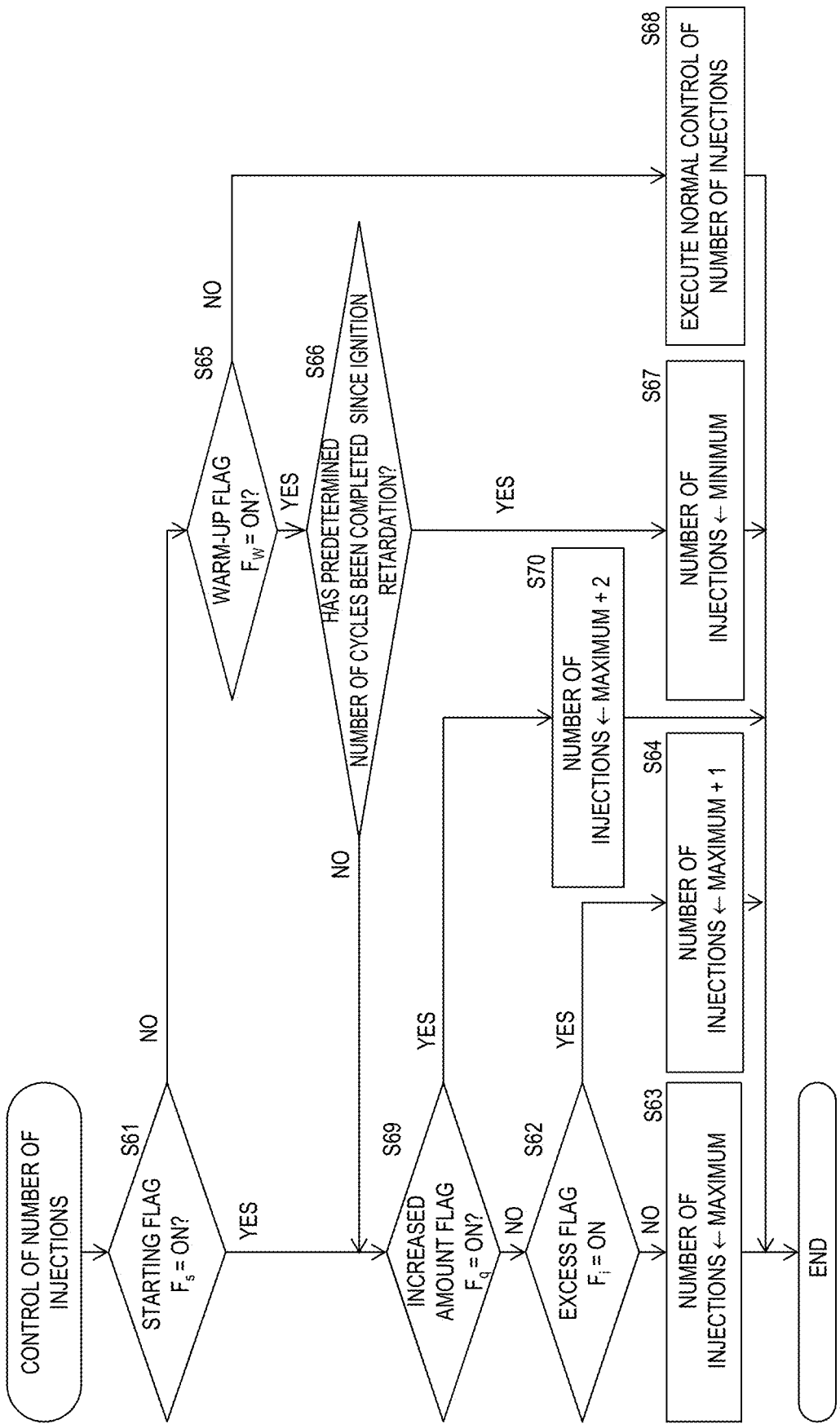
FIG. 11 is a flowchart illustrating a control routine for controlling the number of fuel injections by the fuel injection valve, similar to FIG. 7.

FIG. 11 is a flowchart illustrating a control routine for controlling the number of fuel injections $N_i$ by the fuel injection valve 31, similar to FIG. 7. The ECU 61 executes the illustrated control routine at regular time intervals. Since steps S61 to S68 in FIG. 11 are the same as steps S31 to S38 in FIG. 7, respectively, description thereof will be omitted.

In step S61, when the ECU 61 determines that the starting flag $F_s$ is set to ON, the control routine proceeds to step S69. In step S69, the ECU 61 determines whether the increased amount flag $F_q$ is set to ON. In step S69, when the ECU 61 determines that the increased amount flag $F_q$ is set to ON, the control routine proceeds to step S70. In step S70, the number of fuel injections $N_i$ into each cylinder 11 per cycle is set to be two more than the maximum number of injections $N_{max}$. On the other hand, in step S69, when the ECU 61 determines that the increased amount flag $F_q$ is set to OFF, the control routine proceeds to step S62.

Although the appropriate embodiments of the present disclosure have been described above, an applicable embodiment of the present disclosure is not limited to the above embodiments, and various modifications and changes can be easily made within the scope of the claims.

What is claimed is:

1. A control device of an internal combustion engine, the internal combustion engine including a fuel injection valve that injects fuel into a combustion chamber, the control device comprising:
   an electronic control unit configured to:
      during an operation other than a start-up of the internal combustion engine, cause the fuel injection valve to execute one or a plurality of fuel injections in each cycle such that a target fuel injection amount in one injection becomes equal to or greater than a predetermined minimum injection amount; and
      when the internal combustion engine is started up, in a case where startability of the internal combustion engine is insufficient or expected to be insufficient even when a maximum number of fuel injections is executed per cycle within a range in which the target fuel injection amount in one injection becomes equal to or greater than the minimum injection amount, execute an excess split injection control for causing the fuel injection valve to execute more fuel injections than the maximum number of fuel injections per cycle while making the target fuel injection amount in one injection smaller than the minimum injection amount per cycle and maintaining a target total fuel injection amount per cycle.

2. The control device according to claim 1, wherein, in the excess split injection control, the electronic control unit is configured to cause the fuel injection valve to execute one more fuel injection than the maximum number of fuel injections per cycle.

3. The control device according to claim 1, wherein the electronic control unit is configured to, in a case where the startability of the internal combustion engine is insufficient or expected to be insufficient even when the excess split injection control is executed, execute an increased amount split injection control for causing the fuel injection valve to execute more fuel injections than in the excess split injection control while maintaining the same target fuel injection amount per injection as in the excess split injection control.

4. The control device according to claim 1, wherein the electronic control unit is configured to, when the internal combustion engine is started up, after a predetermined cycle has passed since the fuel injection from the fuel injection valve was started, determine whether the startability of the internal combustion engine is insufficient based on torque output by the internal combustion engine or a rotation speed of the internal combustion engine.

5. The control device according to claim 1, wherein the electronic control unit is configured to determine whether the startability of the internal combustion engine is insufficient based on a property of the fuel supplied to the internal combustion engine and a temperature of the internal combustion engine.

6. The control device according to claim 1, wherein the electronic control unit is configured to, when the internal combustion engine is started up, in a case where the startability of the internal combustion engine is sufficient or is expected to be sufficient when the maximum number of fuel injections is executed per cycle within the range in which the target fuel injection amount in one injection becomes equal to or greater than the minimum injection amount, cause the fuel injection valve to execute the maximum number of fuel injections per cycle within the range in which the target fuel injection amount in one injection becomes equal to or greater than the minimum injection amount.

* * * * *